US012757127B2

(12) United States Patent
Abdelsadek et al.

(10) Patent No.: US 12,757,127 B2
(45) Date of Patent: Oct. 6, 2026

(54) POWER ALLOCATION IN CELLULAR COMMUNICATIONS

(71) Applicant: Dell Products L.P., Round Rock, TX (US)

(72) Inventors: Mohammed Abdelsadek, Kanata (CA); Eran Goldstein, Montreal (CA); Jayaram Venguduswamy Srinivasan, Nepean (CA)

(73) Assignee: Dell Products L.P., Round Rock, TX (US)

( * ) Notice: Subject to any disclaimer, the term of this patent is extended or adjusted under 35 U.S.C. 154(b) by 218 days.

(21) Appl. No.: 18/804,999

(22) Filed: Aug. 14, 2024

(65) Prior Publication Data

US 2026/0052486 A1 Feb. 19, 2026

(51) Int. Cl.

| | |
|---|---|
| ***H04B 1/00*** | (2006.01) |
| ***H04W 52/24*** | (2009.01) |
| ***H04W 52/26*** | (2009.01) |
| ***H04W 52/34*** | (2009.01) |

(52) U.S. Cl.

CPC ....... *H04W 52/346* (2013.01); *H04W 52/241* (2013.01); *H04W 52/262* (2013.01)

(58) Field of Classification Search

CPC . H04W 52/24; H04W 52/241; H04W 52/346; H04W 52/367; H04W 52/262

See application file for complete search history.

(56) References Cited

U.S. PATENT DOCUMENTS 10,057,863 B2 * 8/2018 Janse van Rensburg .................... H04W 52/241
10,355,825 B2 * 7/2019 Agrawal ............... H04L 1/0041
10,548,093 B2 * 1/2020 Benjebbour ........ H04W 52/248

OTHER PUBLICATIONS

Lee, et al. "Box 0 calibration results," IEEE 802.11-14/1450r0, Nov. 2014, [https://mentor.ieee.org/802.11/dcn/14/11-14-1450-00-00ax-box-0-calibration-results.xlsx], 514 pages.

Porat, et al. "11ax Evaluation Methodology" IEEE P802.11 Wireless LANs, Nov. 2014, [https://mentor.ieee.org/802.11/dcn/14/11-14-0571-06-00ax-evaluation-methodology.docx] 39 pages.

* cited by examiner

*Primary Examiner* — Tuan Pham
(74) *Attorney, Agent, or Firm* — Amin, Turocy & Watson, LLP

(57) ABSTRACT

A system can allocate respective portions of electrical power to respective subbands of a group of subbands that facilitate broadband cellular communications with a user equipment based on an effective signal-to-interference-plus-noise ratio, wherein the effective signal-to-interference-plus-noise ratio is based on respective signal-to-interference-plus-noise ratios of the respective subbands satisfying a criterion. The system can determine a modulation coding scheme based on the effective signal-to-interference-plus-noise ratio. The system can communicate with the user equipment as part of the broadband cellular communications based on the modulation coding scheme.

20 Claims, 10 Drawing Sheets

POWER ALLOCATION IN CELLULAR COMMUNICATIONS

BACKGROUND

Broadband cellular networks can facilitate network communications with user equipment (UE).

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can allocate respective portions of electrical power to respective subbands of a group of subbands that facilitate broadband cellular communications with a user equipment based on an effective signal-to-interference-plus-noise ratio, wherein the effective signal-to-interference-plus-noise ratio is based on respective signal-to-interference-plus-noise ratios of the respective subbands satisfying a criterion. The system can determine a modulation coding scheme based on the effective signal-to-interference-plus-noise ratio. The system can communicate with the user equipment as part of the broadband cellular communications based on the modulation coding scheme.

An example method can comprise allocating, by a system comprising at least one processor, respective power levels to respective subbands of a group of subbands of broadband cellular communications with a user equipment based on an effective signal-to-interference-plus-noise ratio, wherein the effective signal-to-interference-plus-noise ratio is based on respective signal-to-interference-plus-noise ratios of the respective subbands having been determined to have satisfied an optimality criterion. The system can further comprise determining, by the system, a modulation coding process to use based on the effective signal-to-interference-plus-noise ratio. The system can further comprise communicating, by the system, with the user equipment as part of the broadband cellular communications based on the modulation coding process.

An example non-transitory computer-readable medium can comprise instructions that, in response to execution, cause a system comprising a processor to perform operations. These operations can comprise allocating respective power levels to respective subbands of broadband cellular communications with a user device based on an effective signal-to-interference-plus-noise ratio, wherein the effective signal-to-interference-plus-noise ratio is based on respective signal-to-interference-plus-noise ratios of the respective subbands satisfying an optimality criterion. These operations can further comprise communicating with the user device as part of the broadband cellular communications based on a modulation coding scheme that is based on the effective signal-to-interference-plus-noise ratio.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
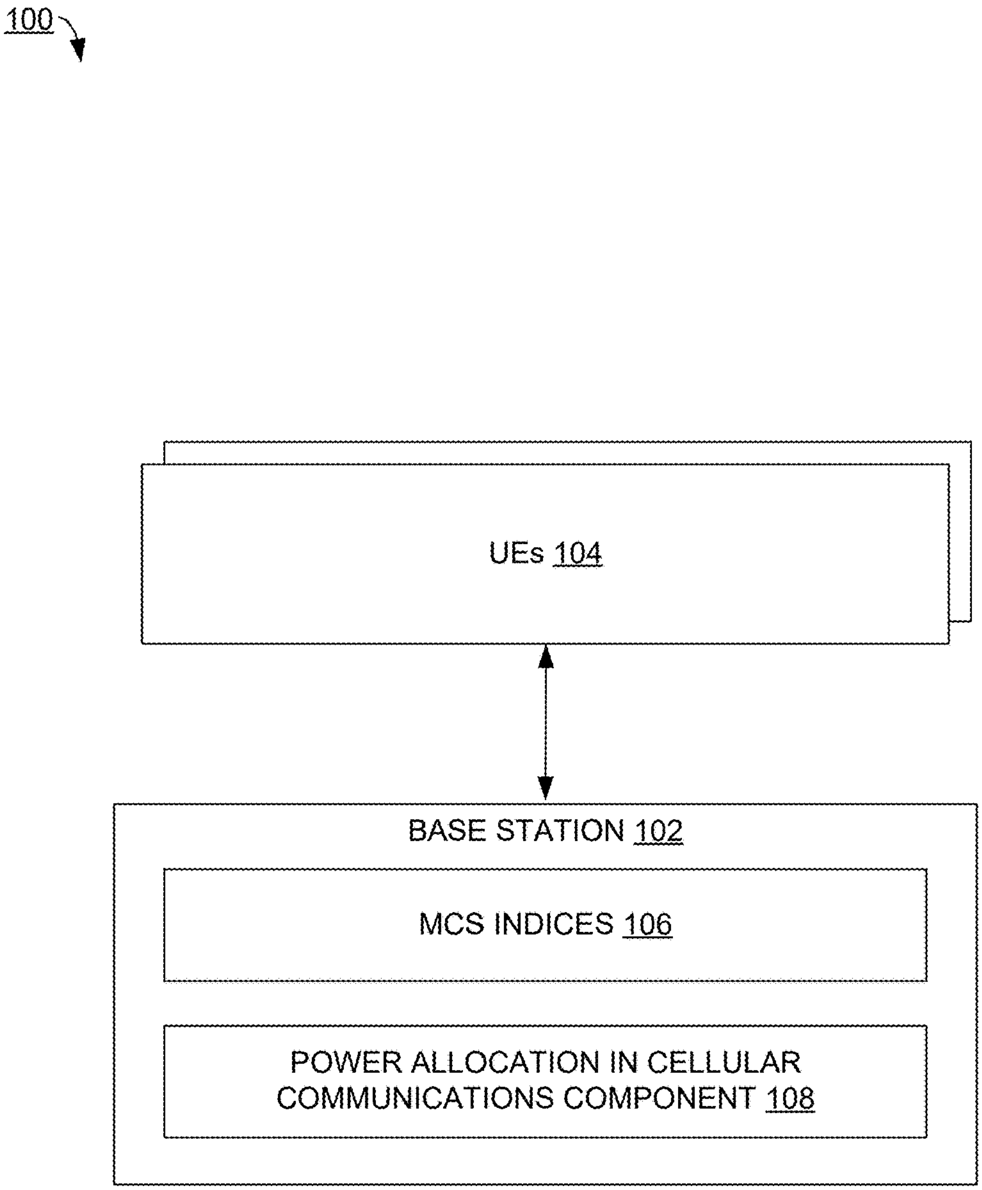
FIG. 1 illustrates an example system architecture that can facilitate power allocation in cellular communications, in accordance with an embodiment of this disclosure.

While the examples herein generally relate to fifth generation (5G) new radio (NR) broadband cellular communications, it can be appreciated that the present techniques can be applied to other scenarios, such as Long-Term Evolution (LTE) and sixth generation (6G) broadband cellular communications.

Link adaptation can be crucial to meet the quality of service (QoS) requirements of the users in 5G NR. To achieve this, the modulation and coding schemes (MCSs) used in the downlink (DL) and uplink (UL) transmissions can be adapted based on the channel conditions in the considered direction. In 5G NR, there can be a predetermined set of supported MCSs, each with an MCS index. In addition, it can be that the selected MCS index must be the same for all the resource blocks (RBs) assigned to the user, and for all the layers of the same transmission. It can be that the higher the MCS index is, the higher spectral efficiency is, and the higher the achieved throughput is.

Therefore, a gNodeB (gNB, sometimes referred to as a base station) can first gather information about the channel conditions utilizing reference signals in the uplink (e.g., sounding reference signal (SRS) and physical uplink shared channel (PUSCH demodulation reference signal (DMRS)) and/or the downlink (e.g., channel state information reference signal (CSI-RS)). Then, different techniques can be employed to maximize the selected MCS index of the allocated RBs. As an example, frequency-selective scheduling can be used in 5G to select the subbands with the highest signal-to-noise-plus-interference ratios (SINRs) over the carrier bandwidth. The MCS index can then be selected such that the estimated block error rate (BLER) is below a threshold (e.g., 10% for regular data transmissions). This can be implemented utilizing modulation and coding scheme signal to noise ratio (MCS-SNR) tables that are based on additive white Gaussian noise (AWGN) simulations or testing. After that, the power can be allocated equally over all the spectrum subbands that the user is using for the transmission.

It can be that the optimal power allocation over the subbands is a water filling technique, which allocates higher power to the subbands with high SNR, and vice versa, such that high MCS can be used in those subbands with improved SINR. However, it can be that this approach cannot be utilized in 5G because the same MCS index must be used over all the subbands and layers. Alternatively, the power can be allocated equally over all the spectrum subbands that the user is using for the transmission. However, it can be that this is not the optimal way to utilize the power and spectrum resources, and relative to the optimal way, this approach increases the required power needed for the transmission and/or reduces the achievable throughput.

Prior approaches in the area can involve allocating the downlink power in 5G NR to be equally distributed over all the subbands that the user is using for the downlink transmission.

The present techniques can be implemented to facilitate allocating the power over spectrum subbands such that the used MCS index is maximized. Examples of the present techniques can relate to the downlink direction (e.g., physical downlink shared channel (PDSCH) communications), as the power allocation can implemented at the gNB. It can be appreciated that the present techniques are applicable to both uplink and downlink directions. In this regard, an effective SINR concept, as discussed below, can be utilized.

Due to frequency-selective fading, the SINR of the subbands can take different values. In addition, based on a multiple-input multiple-output (MIMO) channel matrix condition number, the SINR of the spatial layers can take different values, as well. Therefore, there can be a need to compress all the different SINR values on the subbands and spatial layers into a single value that represents the channel condition between the transmitter and receiver. This SINR value can be utilized for mapping to an MCS index. An approach can be to determine the average of all the different values. However, this can yield an inaccurate SINR representation, and inaccurate MCS selection, consequently. The alternative approach can be to use a certain mapping model to calculate the "effective SINR," which can be known as a physical layer abstraction.

The general form of an example effective SINR to map the SINR per subband and layer to an effective representative single value is as follows:

$$\gamma_{eff} = \alpha\phi^{-1}\left(\frac{1}{LK}\sum_{l=1}^{L}\sum_{k=1}^{K}\phi\left(\frac{\gamma_{k,l}}{\beta}, M\right), M\right) \tag{1}$$

where:

L and K are the number of layers and subbands, respectively.

$$\gamma_{k,l} = P_k\gamma'_{k,l}$$

is the SINR value of the k-th subband and the l-th layer, where $$\gamma'_{k,l}$$

is the normalized SINR with unit transmit power and $P_k$ is the transmit power of subband k. α and β are calibration parameters that can be used to adjust the effective SINR value based on the BLER curves for more accurate results.

ϕ(•) is the mapping function, as discussed below.

M is the modulation order.

The mapping function can depend on the adopted model. In some examples, it can be used as a closed form function or as a lookup table. A received bit mutual information rate (RBIR) model can be used, where the RBIR mapping function is given as follows:

$$\phi(\gamma_{k,l}, M) = \log_2 M - \frac{1}{M}\sum_{m=1}^{M}E_U\left\{\log_2\left(\sum_{i=1}^{M}\exp\left[|U|^2 - \left|\sqrt{\gamma_{k,l}}\,(s_i - s_m) + U^2\right|^2\right]\right)\right\}, \tag{2}$$

where:

U is a zero-mean complex Gaussian random variable with variance 1 (that is, $U \sim \mathcal{CN}(0, 1)$).

$E_U\{\bullet\}$ is the expectation over U.

s is the modulation symbol.

Allocating the DL power over the subbands according to the present techniques can result in a gain that can be used as follows:

1. A higher MCS index can be used given the higher effective SINR, which can yield an improved spectral efficiency.
2. The same MCS level can be used while reducing the transmit power, which can improve the power efficiency.
3. Both higher MCS and reduced power can be achieved where the gain is high enough.

Example Architectures, Process Flows, and Signal Flow

FIG. 1 illustrates an example system architecture 100 that can facilitate power allocation in cellular communications, in accordance with an embodiment of this disclosure.

System architecture 100 comprises base station 102 and UEs 104. In turn, base station 102 comprises MCS indices, and power allocation in cellular communications component 108.

Figure 10:
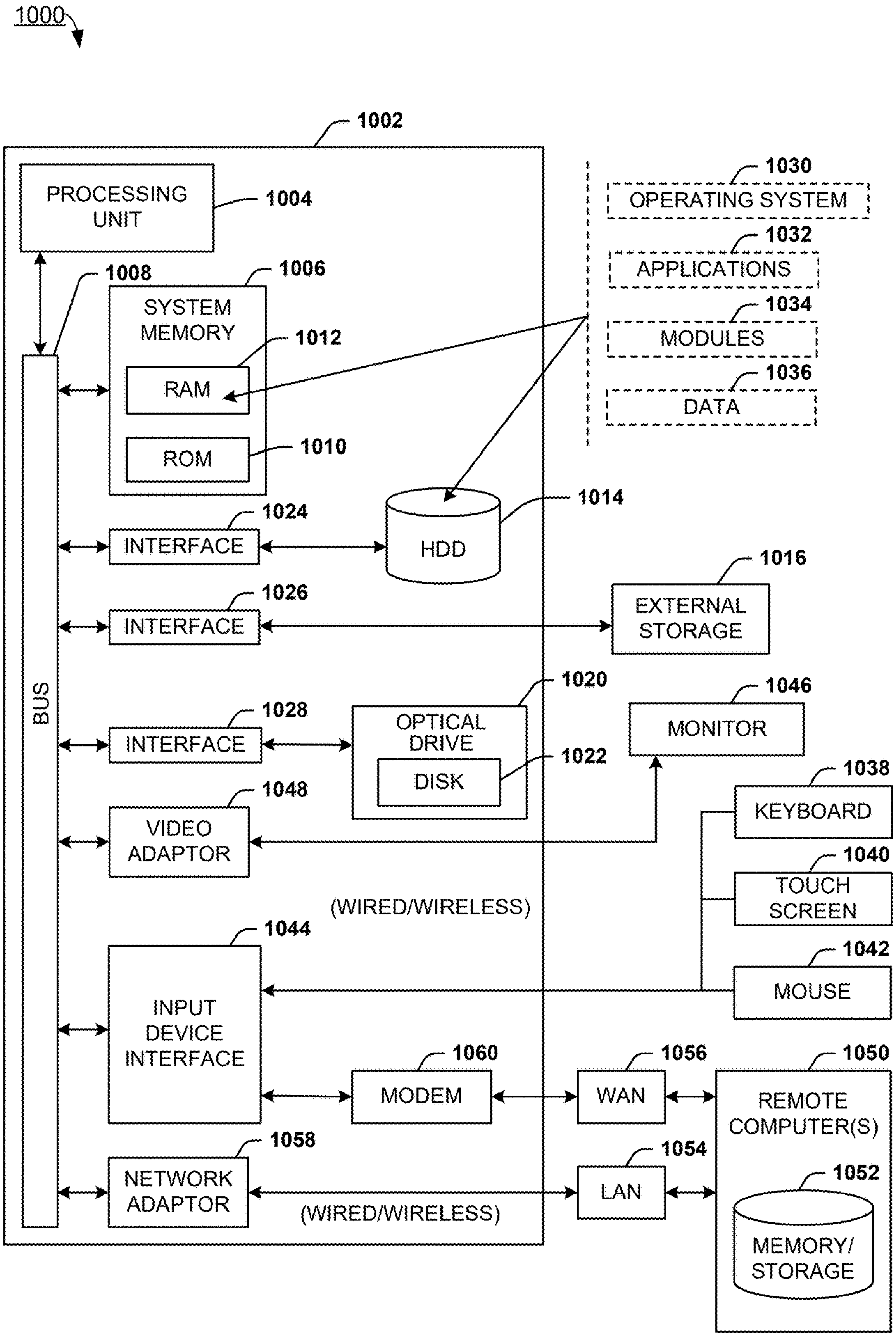
FIG. 10 illustrates an example block diagram of a computer operable to execute an embodiment of this disclosure.

Each of base station 102 and/or UEs 104 can be implemented with part(s) of computing environment 1000 of FIG. 10.

Base station 102 can conduct broadband cellular communications with a UE of UEs 104 using multiple subbands and/or multiple layers. In doing so, power allocation in cellular communications component 108 can determine how to allocate power among the subbands and/or layers to optimize (or satisfactorily improve) an eSINR, and therefore a MCS index (of MCS indices 106) used for the broadband cellular communications.

Figure 4:
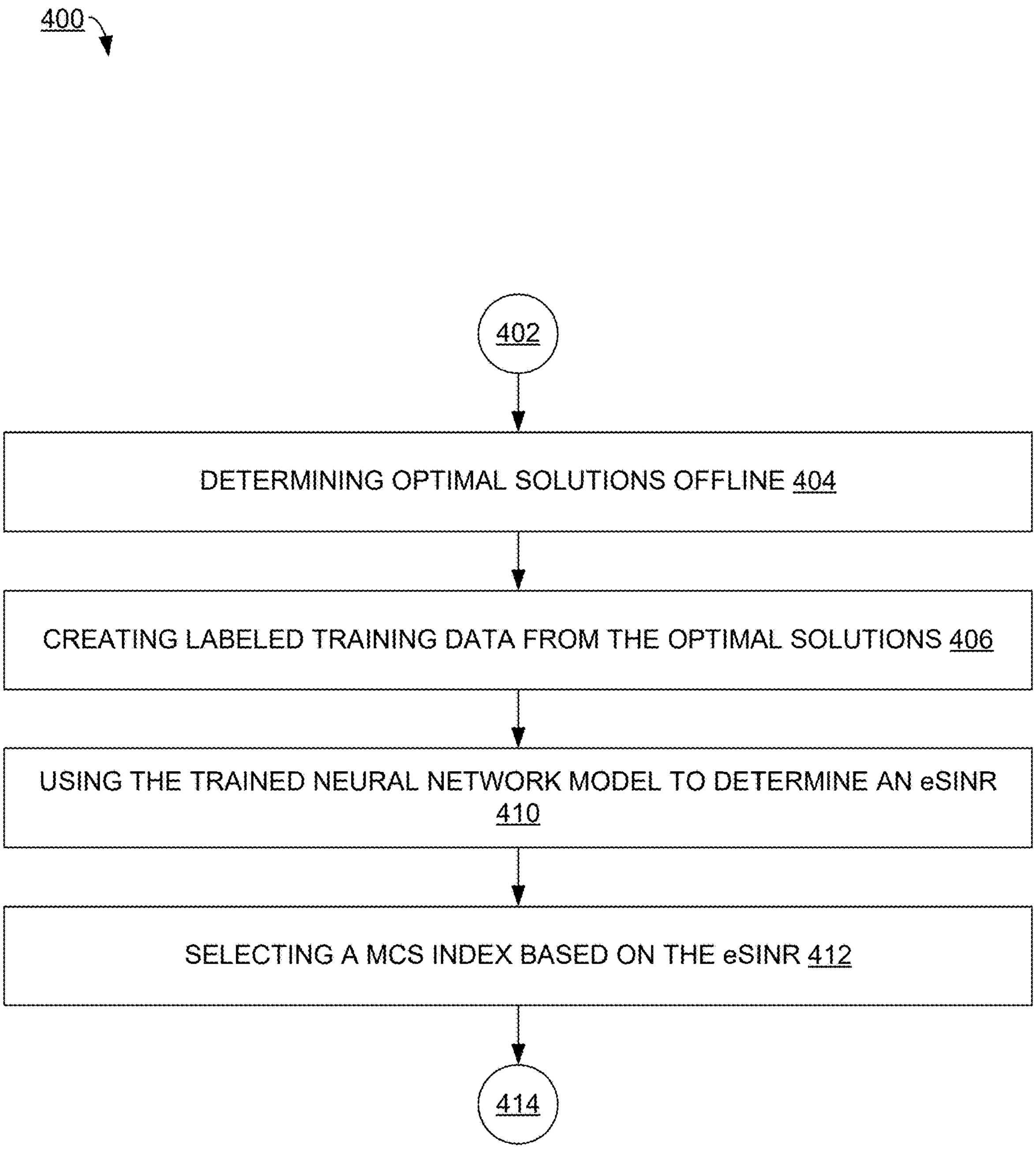
FIG. 4 illustrates an example process flow for training and using a neural network model, and that can facilitate power allocation in cellular communications, in accordance with an embodiment of this disclosure.
Figure 5:
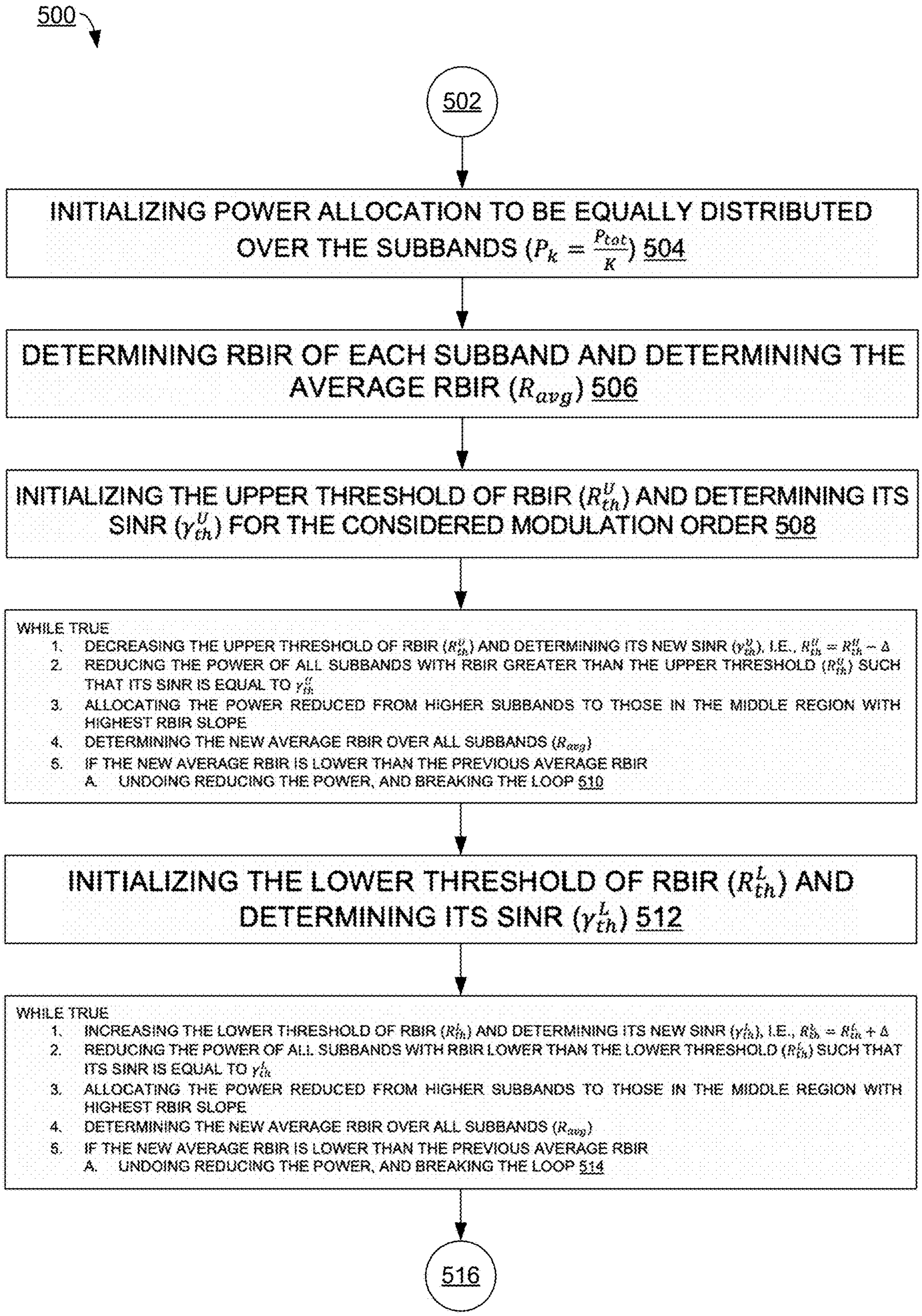
FIG. 5 illustrates an example process flow for implementing a heuristic approach, and that can facilitate power allocation in cellular communications, in accordance with an embodiment of this disclosure.

In some examples, power allocation in cellular communications component 108 can implement part(s) of the process flows of FIGS. 4-5 and/or 7-9 to facilitate power allocation in cellular communications.

It can be appreciated that system architecture 100 is one example system architecture for power allocation in cellular communications, and that there can be other system architectures that facilitate power allocation in cellular communications.

Figure 2:
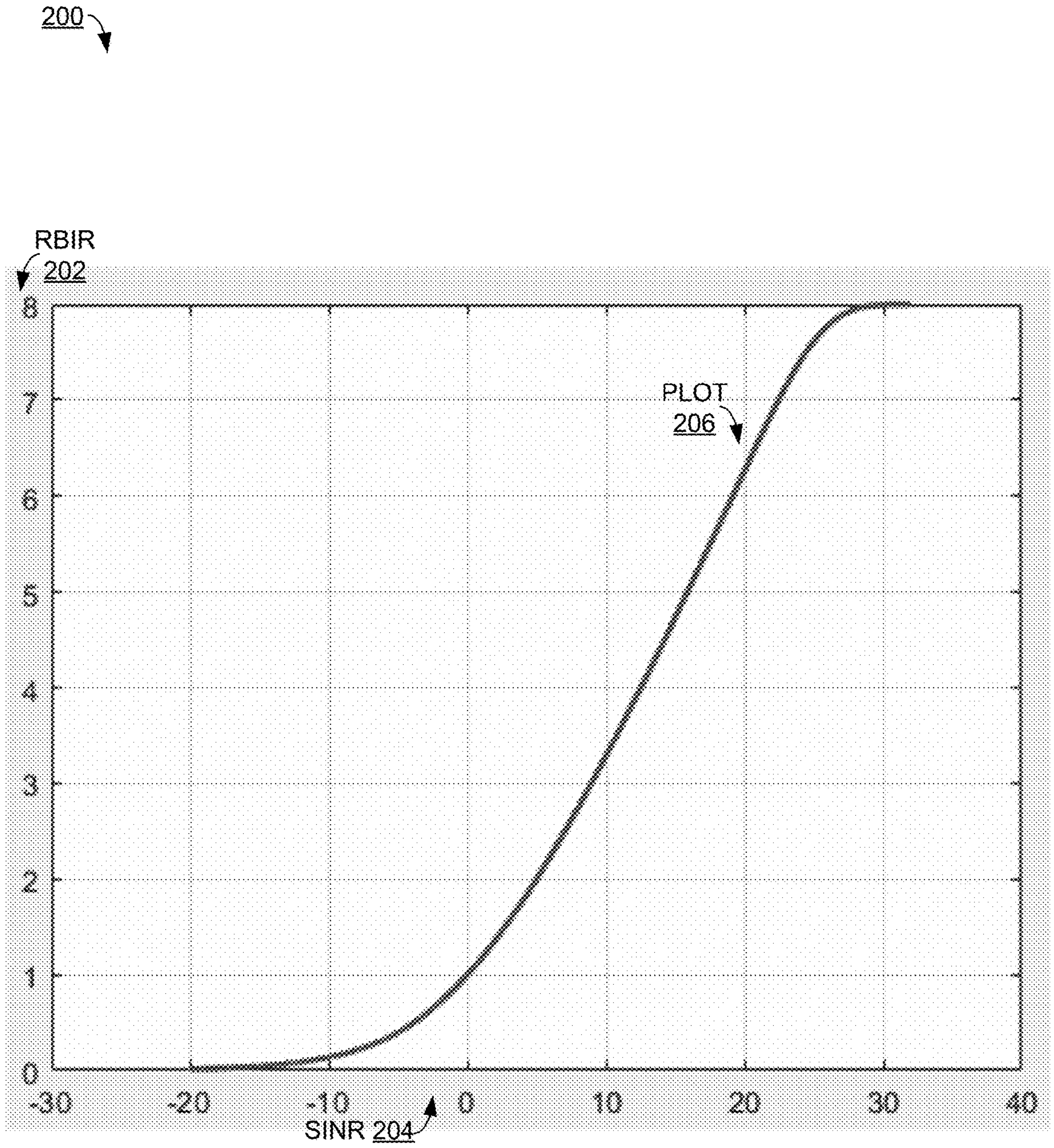
FIG. 2 illustrates an example graph of a received bit mutual information rate (RBIR) function with a modulation order (M) of 8, and that can facilitate power allocation in cellular communications, in accordance with an embodiment of this disclosure.

FIG. 2 illustrates an example graph 200 of a received bit mutual information rate (RBIR) function with a modulation order (M) of 8, and that can facilitate power allocation in cellular communications, in accordance with an embodiment of this disclosure. In some examples, part(s) of graph 200 can be implemented by part(s) of system architecture 100 of FIG. 1 to facilitate power allocation in cellular communications.

Graph 200 comprises RBIR 202, SINR 204, plot 206, and power allocation in cellular communications component 208 (which can be similar to power allocation in cellular communications component 108 of FIG. 1).

FIG. 2 illustrates a RBIR function as described herein for modulation order 8.

Since the effective SINR is used to determine the MCS index, allocating the power such that the effective SINR is maximized, maximizes the selected MCS level. That is, the power allocation can be formulated as an optimization problem as follows:

$$P_k = \arg\max\ \alpha\phi^{-1}\left(\frac{1}{LK}\sum_{l=1}^{L}\sum_{k=1}^{K}\phi\left(\frac{P_k\gamma_{k,l}'}{\beta}, M\right), M\right), \tag{3}$$

$$\text{s.t.}\ \sum_{k=1}^{K} P_k = P_{tot}, \tag{3a}$$

$$P_k > 0,\ 1 \le k \le K, \tag{3b}$$

where $P_k$ is the power allocated to subband k, and $P_{tot}$ is the total power assigned to the user's transmission.

Since the RBIR mapping function, $\phi(\bullet)$, is a monotonically non-decreasing function, the power allocation problem can be reformulated as follows:

$$P_k = \arg\max\ \frac{1}{LK}\sum_{l=1}^{L}\sum_{k=1}^{K}\phi\left(\frac{P_k\gamma_{k,l}'}{\beta}, M\right), \tag{4}$$

$$\text{s.t.}\ \sum_{k=1}^{K} P_k = P_{tot}, \tag{4a}$$

$$P_k > 0,\ 1 \le k \le K. \tag{4b}$$

That is, power allocation can target maximizing the average RBIR of all subbands. Below is an example that shows the effectiveness of this power allocation.

Figure 3:
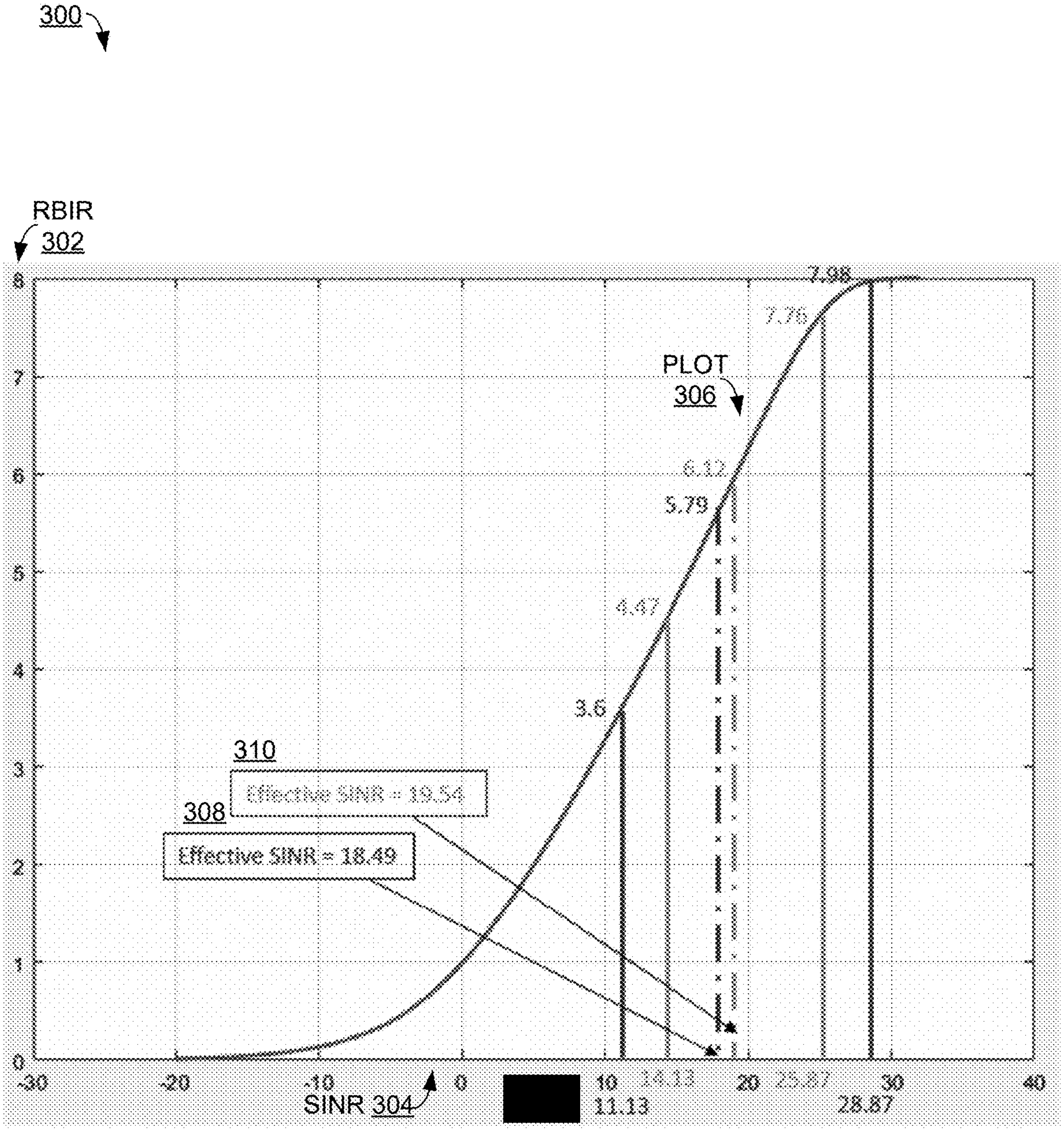
FIG. 3 illustrates an example graph of power allocation improving the effective signal-to-noise-and-interference ratio (SINR) of two subbands, and that can facilitate power allocation in cellular communications, in accordance with an embodiment of this disclosure.

FIG. 3 illustrates an example graph 300 of power allocation improving the effective signal-to-noise-and-interference ratio (SINR) of two subbands, and that can facilitate power allocation in cellular communications, in accordance with an embodiment of this disclosure. In some examples, part(s) of graph 300 can be implemented by part(s) of system architecture 100 of FIG. 1 to facilitate power allocation in cellular communications.

Graph 300 comprises RBIR 302, SINR 304, plot 306, eSINR 308, and eSINR 310. Through implementing the present techniques in adjusting power allocation, eSINR 310 can be used instead of eSINR 308, where eSINR 310 offers a greater amount of gain than eSINR 308.

FIG. 3 illustrates an example of two subbands with SINRs of 28.87 decibels (dB) and 11.13 dB when power is equally allocated to the two subbands. That is, the power allocation is as follows:

$$P_1 = P_2 = \frac{P_{tot}}{2}$$

The corresponding RBIR values are 7.98 and 3.6, respectively. Therefore, the average RBIR is 5.79, and the effective SINR of these two bands would be 18.49 dB. However, if the power allocation changes to the following:

$$P_1 = \frac{P_{tot}}{4},\ P_2 = \frac{3P_{tot}}{4}$$

The SINR of the two subbands would be 25.87 dB and 14.13 dB with RBIR of 7.76 and 4.47, respectively. This yields an average RBIR of 6.12 and an effective SINR of 19.54 dB. That is, in this example, more than 1 dB gain can be achieved by adjusting the power allocation.

FIG. 4 illustrates an example process flow 400 for power allocation in cellular communications, in accordance with an embodiment of this disclosure. In some examples, one or more embodiments of process flow 400 can be implemented by system architecture 100 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of process flow 500 of FIG. 5, process flow 700 of FIG. 7, process flow 800 of FIG. 8, and/or process flow 900 of FIG. 9.

Process flow 400 begins with 402, and moves to operation 404.

Operation 404 depicts determining optimal solutions offline.

After operation 404, process flow 400 moves to operation 406.

Operation 406 depicts creating labeled training data from the optimal solutions.

After operation 406, process flow 400 moves to operation 408.

Operation 408 depicts training a neural network model with the labeled training data.

After operation 408, process flow 400 moves to operation 410.

Operation 410 depicts using the trained neural network model to determine an eSINR.

After operation 410, process flow 400 moves to operation 412.

Operation 412 depicts selecting a MCS index based on the eSINR.

After operation 412, process flow 400 moves to 414, where process flow 400 ends.

Power allocation techniques can be implemented as follows. There can be an optimal allocation, where the optimization problem in (4) can be solved numerically. However, it can be that the optimal solution can be determined to be unsuitable for real time operation.

There can be an artificial intelligence/machine learning (AI/ML)-based allocation. In some examples, optimal solution of the optimization problem in (4) can be implemented offline, and the results used as labelled data to train a neural network model. After the training process, the neural network can be used in real time to predict efficient power allocation such that the effective SINR is maximized (or satisfies an optimality criterion).

FIG. 5 illustrates an example process flow 500 for power allocation in cellular communications, in accordance with an embodiment of this disclosure. In some examples, one or more embodiments of process flow 500 can be implemented by system architecture 100 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of process flow 400 of FIG. 4, process flow 700 of FIG. 7, process flow 800 of FIG. 8, and/or process flow 900 of FIG. 9.

Process flow 500 begins with 502, and moves to operation 504.

Operation 504 depicts initializing power allocation to be equally distributed over the subbands $$\left(P_k = \frac{P_{tot}}{K}\right).$$

After operation 504, process flow 500 moves to operation 506.

Operation 506 depicts determining RBIR of each subband and determining the average RBIR ($R_{avg}$).

After operation 506, process flow 500 moves to operation 508.

Operation 508 depicts initializing the upper threshold of $$RBIR\ (R_{th}^{U})$$

and determining its $$SINR\ (\gamma_{th}^{U})$$

for the considered modulation order.

After operation 508, process flow 500 moves to operation 510.

Operation 510 depicts, while True,

1. Decreasing the upper threshold of $$RBIR\ (R_{th}^{U})$$

and determining its new $$SINR\ (\gamma_{th}^{U}),\ \text{i.e., } R_{th}^{U} = R_{th}^{U} - \Delta$$

2. Reducing the power of all subbands with RBIR greater than the upper threshold $$(R_{th}^{U})$$

such that its SINR is equal to $$\gamma_{th}^{U}$$

3. Allocating the power reduced from higher subbands to those in the middle region with highest RBIR slope.
4. Determining the new average RBIR over all subbands ($R_{avg}$)
5. If the new average RBIR is lower than the previous average RBIR A. Undoing reducing the power, and breaking the loop.

After operation 510, process flow 500 moves to operation 512.

Operation 512 depicts initializing the lower threshold of $$RBIR\ (R_{th}^{L})$$

and determining its $$SINR\ (\gamma_{th}^{L}).$$

After operation 512, process flow 500 moves to operation 514.

Operation 514 depicts, while True,

1. Increasing the lower threshold of $$RBIR\ (R_{th}^{L})$$

and determining its new $$SINR\ (\gamma_{th}^{L}),\ \text{i.e., } R_{th}^{L} = R_{th}^{L} + \Delta$$

2. Reducing the power of all subbands with RBIR lower than the lower threshold $$(R_{th}^{L})$$

such that its SINR is equal to $$\gamma_{th}^{L}$$

3. Allocating the power reduced from higher subbands to those in the middle region with highest RBIR slope.
4. Determining the new average RBIR over all subbands ($R_{avg}$)
5. If the new average RBIR is lower than the previous average RBIR
   A. Undoing reducing the power, and breaking the loop.

After operation 514, process flow 500 moves to 516, where process flow 500 ends.

There can be a heuristic allocation. A heuristic technique can be implemented to allocate the power such that the effective SINR is maximized (or satisfies an optimality criterion) according to the optimization problem in (4). In some examples, a heuristic allocation can be implemented as according to process flow 500.

Figure 6:
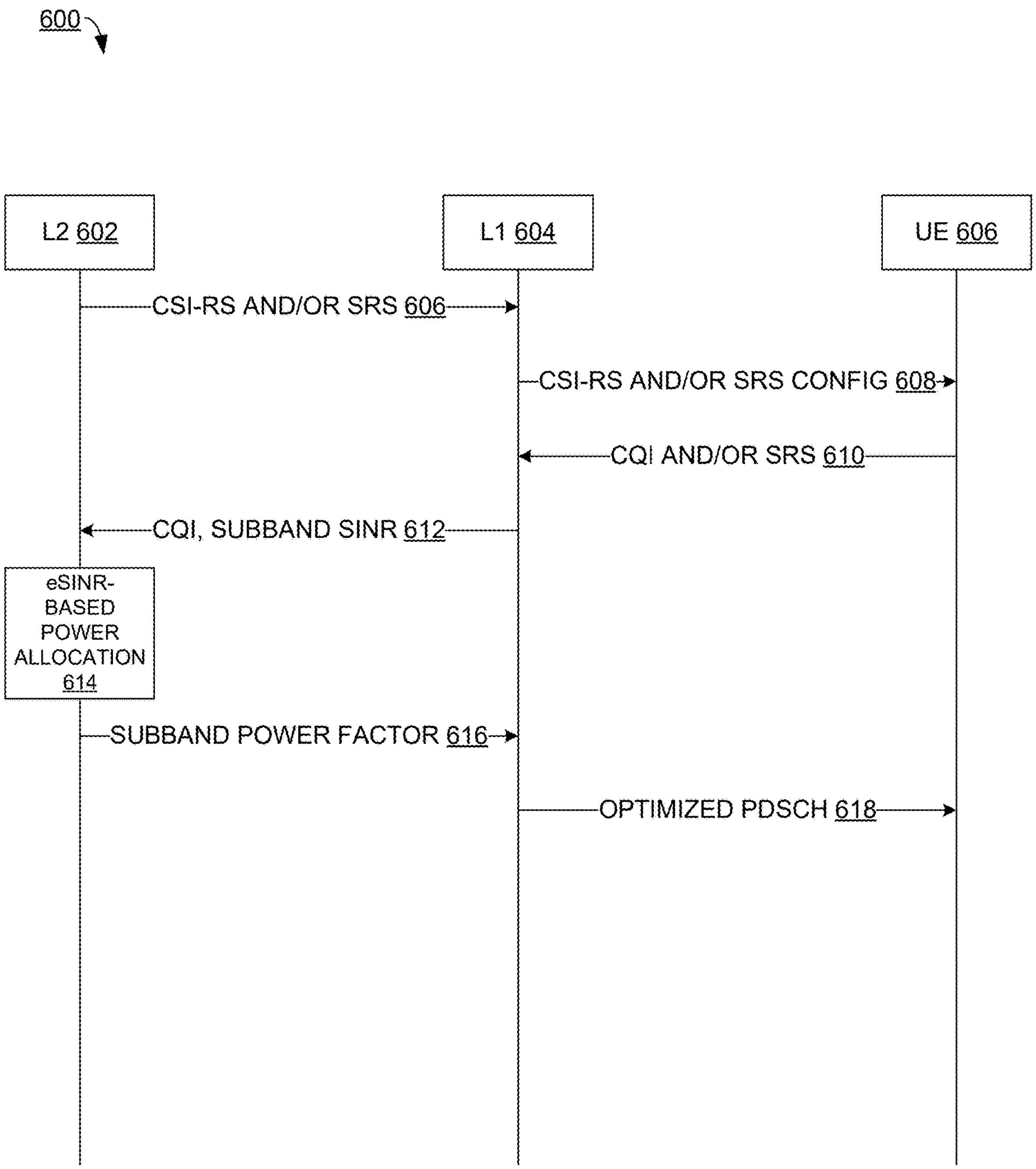
FIG. 6 illustrates an example signal flow for power allocation in cellular communications, in accordance with an embodiment of this disclosure.

FIG. 6 illustrates an example signal flow 600 for power allocation in cellular communications, in accordance with an embodiment of this disclosure. In some examples, part(s) of signal flow can be implemented by part(s) of system architecture 100 of FIG. 1 to facilitate power allocation in cellular communications.

Signals of signal flow 600 occur between data link layer (L2) 602, physical layer (L1) 604, and UE 606. Signals of signal flow 600 are:

channel state information reference signal (CSI-RS) and/or sounding reference signal (SRS) 606;
CSI-RS and/or SRS config 608;
channel quality indicator (CQI) and/or SRS 610;
CQI, subband SINR 612;
eSINR-based power allocation 614;
subband power factor 616; and
optimized physical downlink shared channel (PDSCH) 618.

Example Process Flows

Figure 7:
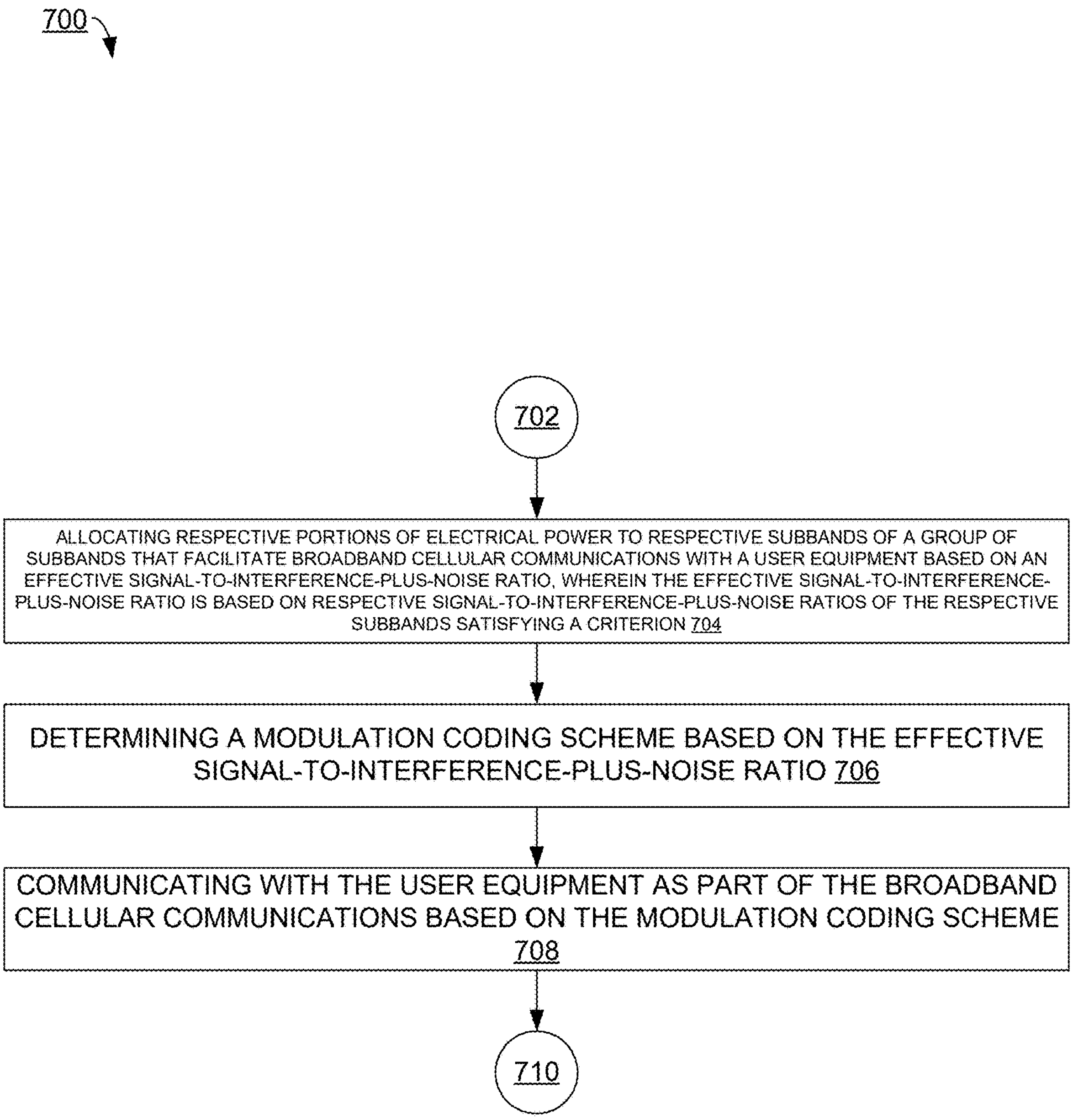
FIG. 7 illustrates an example process flow for power allocation in cellular communications, in accordance with an embodiment of this disclosure.

FIG. 7 illustrates an example process flow 700 for power allocation in cellular communications, in accordance with an embodiment of this disclosure. In some examples, one or more embodiments of process flow 700 can be implemented by system architecture 100 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 400 of FIG. 4, process flow 500 of FIG. 5, process flow 800 of FIG. 8, and/or process flow 900 of FIG. 9.

Process flow 700 begins with 702, and moves to operation 704.

Operation 704 depicts allocating respective portions of electrical power to respective subbands of a group of subbands that facilitate broadband cellular communications with a user equipment based on an effective signal-to-interference-plus-noise ratio, wherein the effective signal-to-interference-plus-noise ratio is based on respective signal-to-interference-plus-noise ratios of the respective subbands satisfying a criterion. That is, power allocation for subbands can be determined based on eSINR, such as to maximize eSINR.

In some examples, the facilitating of the broadband cellular communications with the user equipment occurs via a group of layers, and wherein the respective signal-to-interference-plus-noise ratios of the respective subbands are applied at respective layers of the group of layers. That is, the communications can occur over multiple layers and multiple subbands, and power allocation can be performed for the multiple layers and multiple subbands.

In some examples, the effective signal-to-interference-plus-noise ratio is determined as a function of a calibration parameter based on a block error rate curve. In some examples, the calibration parameter is determined as a first function of a first calibration parameter, and the effective signal-to-interference-plus-noise ratio is determined as a second function of a second calibration parameter based on the block error rate curve. That is, these calibration parameters can be $\alpha$ and $\beta$, as described herein, and that can be used to adjust the effective SINR value based on BLER curves.

In some examples, the effective signal-to-interference-plus-noise ratio is determined based on a mapping function. This mapping function can be $\phi(\bullet)$, as described herein.

In some examples, the mapping function comprises a closed-form function. In some examples, the mapping function comprises a lookup table. In some examples, the mapping function comprises a received bit mutual information rate model. In some examples, the mapping function can be used as a closed form function or as a lookup table. An RBIR model can be used.

After operation 704, process flow 700 moves to operation 706.

Operation 706 depicts determining a modulation coding scheme based on the effective signal-to-interference-plus-noise ratio. That is, an MCS index can be determined based on the eSINR value of operation 706.

After operation 706, process flow 700 moves to operation 708.

Operation 708 depicts communicating with the user equipment as part of the broadband cellular communications based on the modulation coding scheme. That is, the MCS index can be used in communicating with a UE.

After operation 708, process flow 700 moves to 710, where process flow 700 ends.

Figure 8:
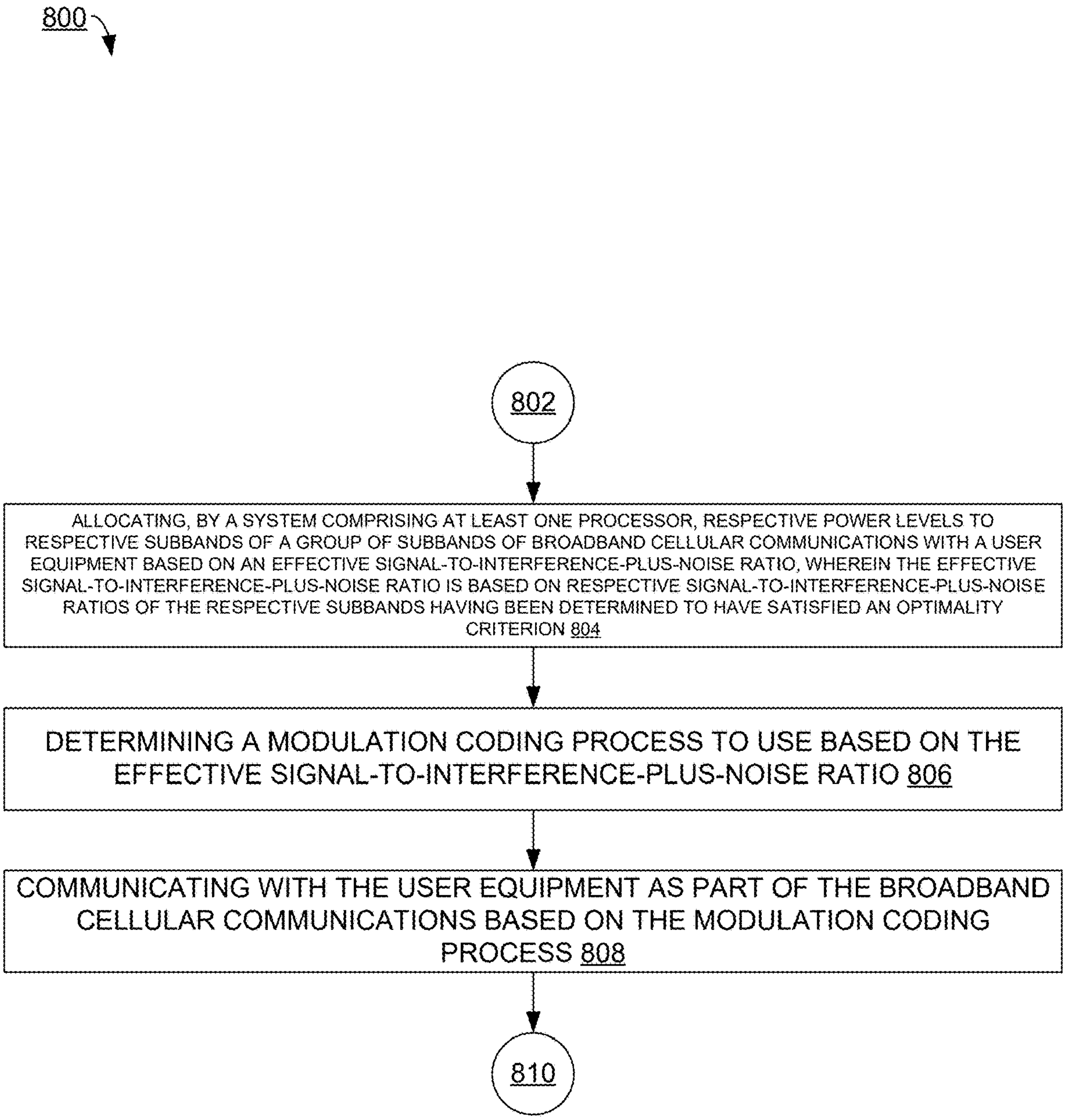
FIG. 8 illustrates another example process flow for power allocation in cellular communications, in accordance with an embodiment of this disclosure.

FIG. 8 illustrates an example process flow 800 for power allocation in cellular communications, in accordance with an embodiment of this disclosure. In some examples, one or more embodiments of process flow 800 can be implemented by system architecture 100 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 400 of FIG. 4, process flow 500 of FIG. 5, process flow 700 of FIG. 7, and/or process flow 900 of FIG. 9.

Process flow 800 begins with 802, and moves to operation 804.

Operation 804 depicts allocating respective power levels to respective subbands of a group of subbands of broadband cellular communications with a user equipment based on an effective signal-to-interference-plus-noise ratio, wherein the effective signal-to-interference-plus-noise ratio is based on respective signal-to-interference-plus-noise ratios of the respective subbands having been determined to have satisfied an optimality criterion. In some examples, operation 804 can be implemented in a similar manner as operation 704 of FIG. 7.

In some examples, the effective signal-to-interference-plus-noise ratio is determined based on a modulation order. This can be the modulation order M, as described herein.

In some examples, a total power level is allocated to the broadband cellular communications with the user equipment, and the respective power levels sum to equal the total power level. This can be where $P_k$ is the power allocated to subband k, and $P_{tot}$ is the total power assigned to the user's transmission.

In some examples, the effective signal-to-interference-plus-noise ratio is determined based on a monotonically non-decreasing mapping function. That is, a RBIR mapping function, $\phi(\cdot)$, can be a monotonically non-decreasing function.

In some examples, the allocating of the respective power levels of the respective subbands is based on an average received bit mutual information rate of the respective subbands that that has been identified as satisfying a maximization criterion. That is, power allocation can target maximizing (or sufficiently satisfying) an average RBIR of the subbands.

In some examples, the allocating is performed via a trained machine learning model, allocation decisions are determined offline, and the allocation decisions were provided as labeled training data to train the trained machine learning model. This can be an AI/ML model for which process flow 400 of FIG. 4 is implemented.

After operation 804, process flow 800 moves to operation 806.

Operation 806 depicts determining a modulation coding process to use based on the effective signal-to-interference-plus-noise ratio. In some examples, operation 806 can be implemented in a similar manner as operation 706 of FIG. 7.

After operation 806, process flow 800 moves to operation 808.

Operation 808 depicts communicating with the user equipment as part of the broadband cellular communications based on the modulation coding process. In some examples, operation 808 can be implemented in a similar manner as operation 708 of FIG. 7.

After operation 808, process flow 800 moves to 810, where process flow 810 ends.

Figure 9:
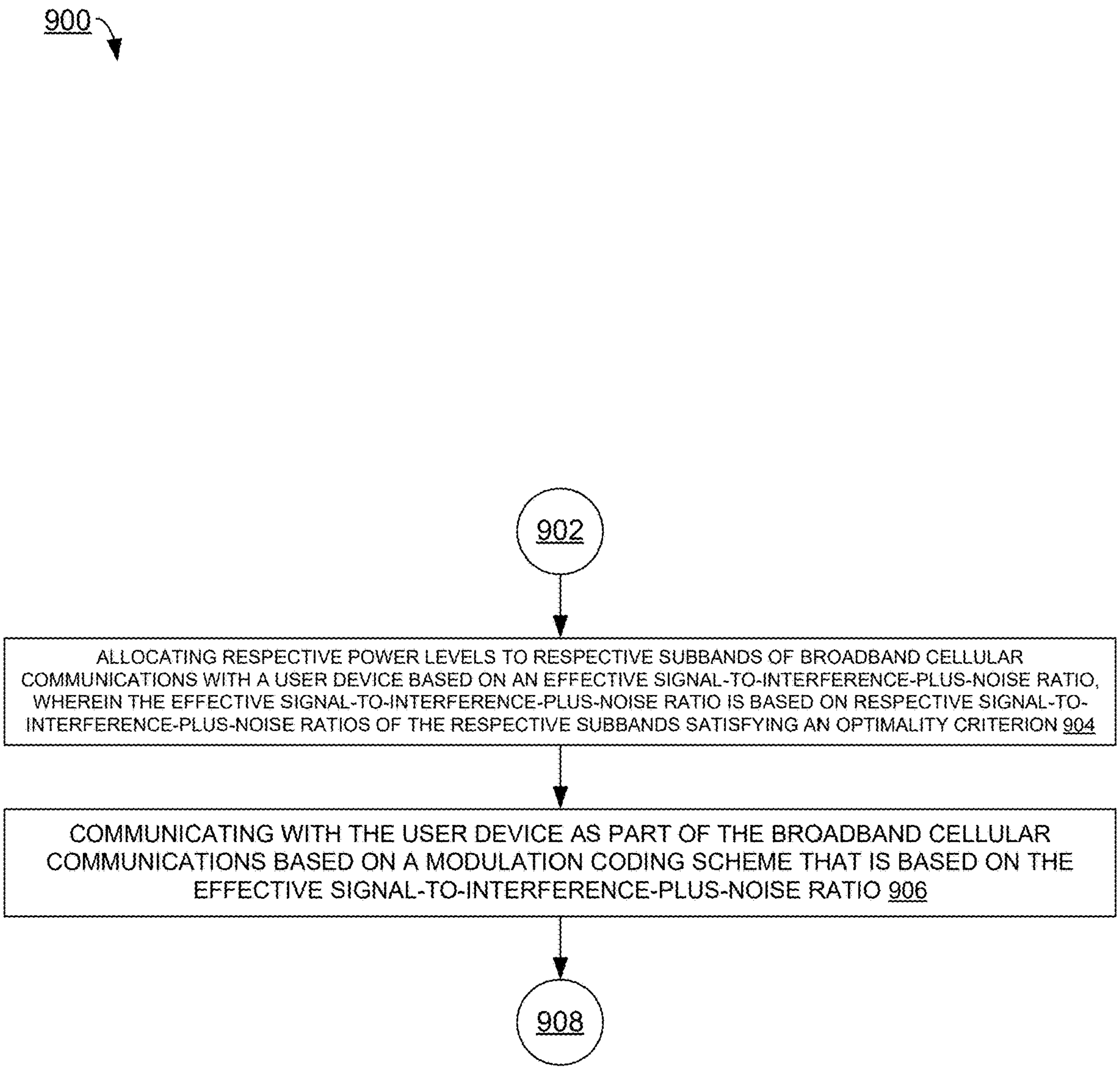
FIG. 9 illustrates another example process flow for power allocation in cellular communications, in accordance with an embodiment of this disclosure.

FIG. 9 illustrates an example process flow 900 for power allocation in cellular communications, in accordance with an embodiment of this disclosure. In some examples, one or more embodiments of process flow 900 can be implemented by system architecture 100 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 400 of FIG. 4, process flow 500 of FIG. 5, process flow 700 of FIG. 7, and/or process flow 800 of FIG. 8.

Process flow 900 begins with 902, and moves to operation 904.

Operation 904 depicts allocating respective power levels to respective subbands of broadband cellular communications with a user device based on an effective signal-to-interference-plus-noise ratio, wherein the effective signal-to-interference-plus-noise ratio is based on respective signal-to-interference-plus-noise ratios of the respective subbands satisfying an optimality criterion. In some examples, operation 904 can be implemented in a similar manner as operations 704-706 of FIG. 7.

In some examples, the allocating of the respective power levels to the respective subbands comprises performing first iterations of decreasing an upper threshold of a received bit mutual information rate; and performing second iterations of increasing a lower threshold of the received bit mutual information rate. This can be implemented in a similar manner as described with respect to FIG. 5.

In some examples, the allocating of the respective power levels to the respective subbands comprises, before the performing the first iterations and before the performing of the second iterations, initializing power allocation to be equally distributed over the respective subbands; initializing the upper threshold of the received bit mutual information rate; and determining an initial signal-to-interference-plus-noise ratio that corresponds to the upper threshold of the received bit mutual information rate. This can be implemented in a similar manner as described with respect to FIG. 5.

In some examples, the performing of the first iterations of decreasing the upper threshold of the received bit mutual information rate comprises, while a first average received bit mutual information rate is greater than a second average received bit mutual information rate from a previous iteration of the first iterations, decreasing the upper threshold of the received bit mutual information rate to produce a modified upper threshold of the received bit mutual information rate; determining a modified signal-to-interference-plus-noise ratio that corresponds to the modified upper threshold of the received bit mutual information rate; reducing power allocated to the respective subbands that have respective received bit mutual information rates greater than the modified upper threshold of the received bit mutual information rate, to produce unallocated power; and allocating the unallocated power to the respective subbands that satisfy a highest received bit mutual information rate criterion. This can be implemented in a similar manner as described with respect to FIG. 5.

In some examples, the performing of the second iterations of increasing the lower threshold of the received bit mutual information rate comprises, while a first average received bit mutual information rate is greater than a second average received bit mutual information rate from a previous iteration of the first iterations, increasing the lower threshold of the received bit mutual information rate to produce a modified lower threshold of the received bit mutual information rate; determining a modified signal-to-interference-plus-noise ratio that corresponds to the modified lower threshold of the received bit mutual information rate; reducing power allocated to the respective subbands that have respective received bit mutual information rates lower than the modified lower threshold of the received bit mutual information rate, to produce unallocated power; and allocating the unallocated power to the respective subbands that satisfy a highest received bit mutual information rate criterion. This can be implemented in a similar manner as described with respect to FIG. 5.

In some examples, the modulation coding scheme is a first modulation coding scheme that corresponds to a first modulation coding scheme index, a first value of the first modulation coding scheme index is greater than a second value of a second modulation coding scheme index, and a first spectral efficiency of first communications according to the first modulation coding scheme index is greater than a second spectral efficiency of second communications according to the second modulation coding scheme index, or a first power efficiency of the first communications according to the first modulation coding scheme index is greater than a second power efficiency of the second communications according to the second modulation coding scheme index. That is, implementing the present techniques can result in using a higher MCS index (relative to other approaches) to yield improved spectral efficiency, in using a same MCS level while reducing transmit power to yield improved power efficiency, or a combination of the two.

After operation 904, process flow 900 moves to operation 906.

Operation 906 depicts communicating with the user device as part of the broadband cellular communications based on a modulation coding scheme that is based on the effective signal-to-interference-plus-noise ratio. In some examples, operation 906 can be implemented in a similar manner as operation 708 of FIG. 7.

After operation 906, process flow 900 moves to 908, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of base station 102 and/or UEs 104 of FIG. 1.

In some examples, computing environment 1000 can implement one or more embodiments of the process flows of FIGS. 4-5 and/or 7-9 to facilitate power allocation in cellular communications.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1016 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term “processor” can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform “operations”, this could include the processor performing the operations directly and/or facilitating, directing, or cooperating with another device or component to perform the operations.

In the subject specification, terms such as “datastore,” data storage,” “database,” “cache,” and substantially any other information storage component relevant to operation and functionality of a component, refer to “memory components,” or entities embodied in a “memory” or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms “component,” “module,” “system,” “interface,” “cluster,” “server,” “node,” or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word “example” or “exemplary” is used herein to mean serving as an example, instance, or illustration. Any embodiment or design described herein as “exemplary” is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

allocating respective portions of electrical power to respective subbands of a group of subbands that facilitate broadband cellular communications with a user equipment based on an effective signal-to-interference-plus-noise ratio, wherein the effective signal-to-interference-plus-noise ratio is based on respective signal-to-interference-plus-noise ratios of the respective subbands satisfying a criterion;

determining a modulation coding scheme based on the effective signal-to-interference-plus-noise ratio; and communicating with the user equipment as part of the broadband cellular communications based on the modulation coding scheme.

2. The system of claim 1, wherein the facilitating of the broadband cellular communications with the user equipment occurs via a group of layers, and wherein the respective signal-to-interference-plus-noise ratios of the respective subbands are applied at respective layers of the group of layers.

3. The system of claim 1, wherein the effective signal-to-interference-plus-noise ratio is determined as a function of a calibration parameter based on a block error rate curve.

4. The system of claim 3, wherein the calibration parameter is determined as a first function of a first calibration parameter, and wherein the effective signal-to-interference-plus-noise ratio is determined as a second function of a second calibration parameter based on the block error rate curve.

5. The system of claim 1, wherein the effective signal-to-interference-plus-noise ratio is determined based on a mapping function.

6. The system of claim 5, wherein the mapping function comprises a closed-form function.

7. The system of claim 5, wherein the mapping function comprises a lookup table.

8. The system of claim 5, wherein the mapping function comprises a received bit mutual information rate model.

9. A method, comprising:

allocating, by a system comprising at least one processor, respective power levels to respective subbands of a group of subbands of broadband cellular communications with a user equipment based on an effective signal-to-interference-plus-noise ratio, wherein the effective signal-to-interference-plus-noise ratio is based on respective signal-to-interference-plus-noise ratios of the respective subbands having been determined to have satisfied an optimality criterion;

determining, by the system, a modulation coding process to use based on the effective signal-to-interference-plus-noise ratio; and communicating, by the system, with the user equipment as part of the broadband cellular communications based on the modulation coding process.

10. The method of claim 9, wherein the effective signal-to-interference-plus-noise ratio is determined based on a modulation order.

11. The method of claim 9, wherein a total power level is allocated to the broadband cellular communications with the user equipment, and wherein the respective power levels sum to equal the total power level.

12. The method of claim 9, wherein the effective signal-to-interference-plus-noise ratio is determined based on a monotonically non-decreasing mapping function.

13. The method of claim 9, wherein the allocating of the respective power levels of the respective subbands is based on an average received bit mutual information rate of the respective subbands that that has been identified as satisfying a maximization criterion.

14. The method of claim 9, wherein the allocating is performed via a trained machine learning model, wherein allocation decisions are determined offline, and wherein the allocation decisions were provided as labeled training data to train the trained machine learning model.

15. A non-transitory computer-readable medium comprising instructions that, in response to execution, cause a system comprising at least one processor to perform operations, comprising:

allocating respective power levels to respective subbands of broadband cellular communications with a user device based on an effective signal-to-interference-plus-noise ratio, wherein the effective signal-to-interference-plus-noise ratio is based on respective signal-to-interference-plus-noise ratios of the respective subbands satisfying an optimality criterion; and communicating with the user device as part of the broadband cellular communications based on a modulation coding scheme that is based on the effective signal-to-interference-plus-noise ratio.

16. The non-transitory computer-readable medium of claim 15, wherein the allocating of the respective power levels to the respective subbands comprises:

performing first iterations of decreasing an upper threshold of a received bit mutual information rate; and performing second iterations of increasing a lower threshold of the received bit mutual information rate.

17. The non-transitory computer-readable medium of claim 16, wherein the operations further comprise:

before the performing the first iterations and before the performing of the second iterations, initializing power allocation to be equally distributed over the respective subbands, initializing the upper threshold of the received bit mutual information rate, and determining an initial signal-to-interference-plus-noise ratio that corresponds to the upper threshold of the received bit mutual information rate.

18. The non-transitory computer-readable medium of claim 16, wherein the performing of the first iterations of decreasing the upper threshold of the received bit mutual information rate comprises:

while a first average received bit mutual information rate is greater than a second average received bit mutual information rate from a previous iteration of the first iterations, decreasing the upper threshold of the received bit mutual information rate to produce a modified upper threshold of the received bit mutual information rate;

determining a modified signal-to-interference-plus-noise ratio that corresponds to the modified upper threshold of the received bit mutual information rate;

reducing power allocated to the respective subbands that have respective received bit mutual information rates greater than the modified upper threshold of the received bit mutual information rate, to produce unallocated power; and allocating the unallocated power to the respective subbands that satisfy a highest received bit mutual information rate criterion.

19. The non-transitory computer-readable medium of claim 16, wherein the performing of the second iterations of increasing the lower threshold of the received bit mutual information rate comprises:

while a first average received bit mutual information rate is greater than a second average received bit mutual information rate from a previous iteration of the first iterations, increasing the lower threshold of the received bit mutual information rate to produce a modified lower threshold of the received bit mutual information rate;

determining a modified signal-to-interference-plus-noise ratio that corresponds to the modified lower threshold of the received bit mutual information rate;

reducing power allocated to the respective subbands that have respective received bit mutual information rates lower than the modified lower threshold of the received bit mutual information rate, to produce unallocated power; and allocating the unallocated power to the respective subbands that satisfy a highest received bit mutual information rate criterion.

20. The non-transitory computer-readable medium of claim 15, wherein the modulation coding scheme is a first modulation coding scheme that corresponds to a first modulation coding scheme index, wherein a first value of the first modulation coding scheme index is greater than a second value of a second modulation coding scheme index, and wherein a first spectral efficiency of first communications according to the first modulation coding scheme index is greater than a second spectral efficiency of second communications according to the second modulation coding scheme index, or wherein a first power efficiency of the first communications according to the first modulation coding scheme index is greater than a second power efficiency of the second communications according to the second modulation coding scheme index.

* * * * *